Figure 9:
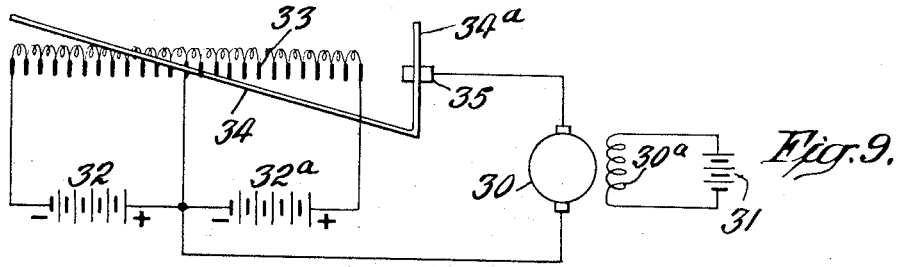

Nov. 14, 1944.   F. G. LOGAN   2,362,650
GUN CONTROLLING APPARATUS AND THE LIKE
Filed Feb. 7, 1942   2 Sheets-Sheet 1
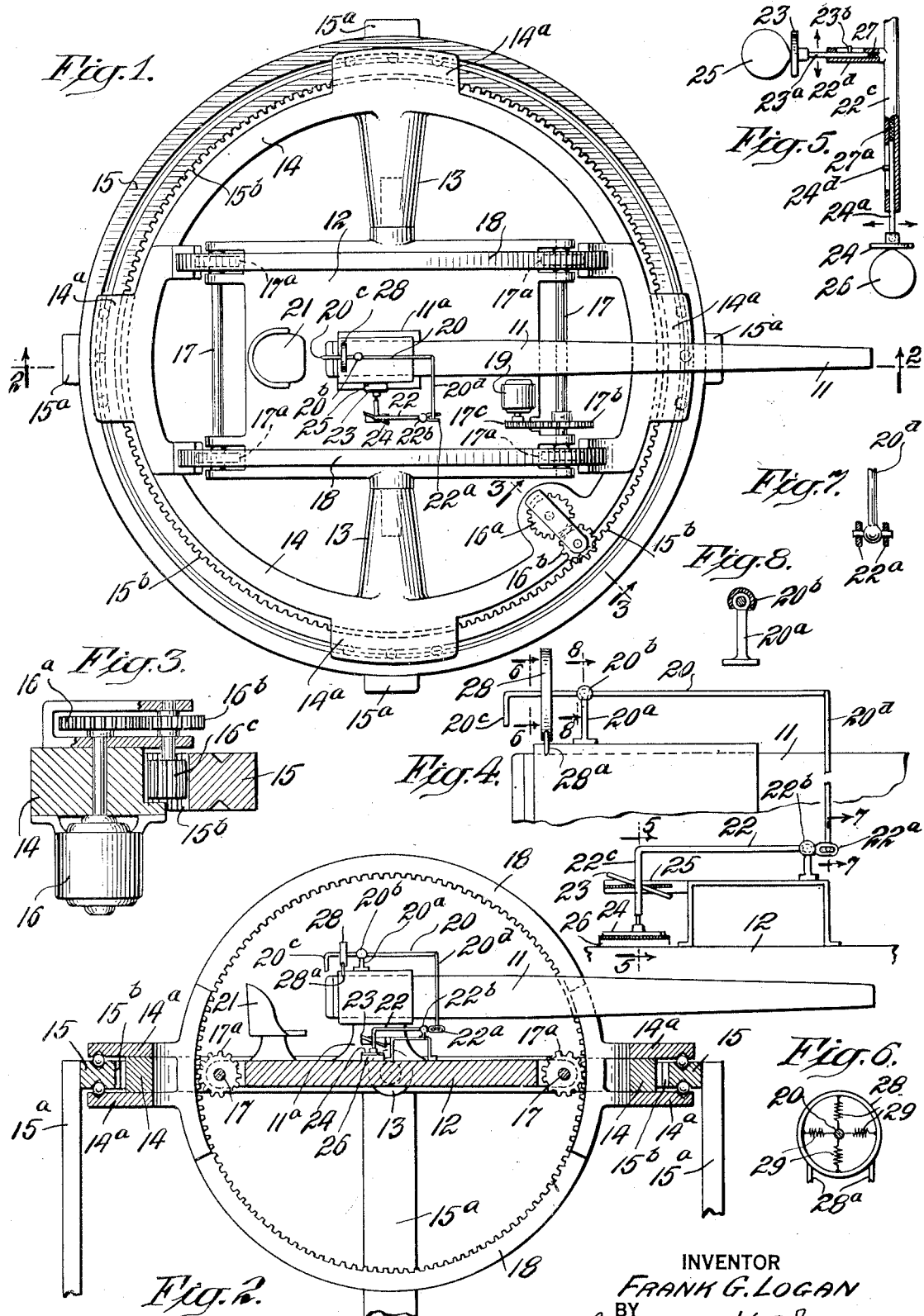
INVENTOR
FRANK G. LOGAN
BY
Lawrence K. Sager
his ATTORNEY Nov. 14, 1944. F. G. LOGAN 2,362,650
GUN CONTROLLING APPARATUS AND THE LIKE
Filed Feb. 7, 1942 2 Sheets-Sheet 2

INVENTOR
FRANK G. LOGAN
BY Lawrence K. Sager
his ATTORNEY

Patented Nov. 14, 1944

2,362,650

UNITED STATES PATENT OFFICE 2,362,650

GUN CONTROLLING APPARATUS AND THE LIKE

Frank G. Logan, Mount Vernon, N. Y., assignor to Ward Leonard Electric Company, a corporation of New York Application February 7, 1942, Serial No. 429,905

8 Claims. (Cl. 172—239)

This invention relates to an improved electromechanical system for actuating an object or apparatus which cannot itself be moved conveniently or rapidly directly by the operator to a desired position with a high degree of accuracy. One of the important applications is to the control of a gun for rapidly bringing it in position for hitting an objective. The invention is applicable to the movement of heavy guns of large caliber and also to small guns now manually moved with some difficulty by the operator in his effort to secure rapid and accurate aiming of the gun. The invention is likewise applicable to the control of other objects or apparatus where proper positioning of them is desired by auxiliary means which may be simply and conveniently manipulated.

The main object of the invention is to provide a simple and dependable form of auxiliary control apparatus for the above purposes which may be conveniently controlled by the operator. Another object is to secure a wide range of movement of the gun or other object in a horizontal plane, or a vertical plane, or in an intermediate position between such planes. Another object is to secure rapid movement of the gun or other object over the full range of control in any direction within a few seconds and to impart a rate of speed of movement to the gun which will be dependent upon the required movement from the position occupied by the gun to the desired position, that is, the greater the extent of movement required, the higher will be the rate of speed imparted by the control apparatus. Another object is to obtain a comparatively high degree of accuracy in the aiming of the gun or the positioning of the controlled apparatus. Another object is to provide apparatus which will require a minimum amount of care and adjustment under long continued use and which can be depended upon for maintaining its accuracy of control. Another object is to insure that the parts will be dependable under severe shocks and jars and not likely to get out of order.

Another object is to provide that the greater the pressure by the operator for causing actuation of the control apparatus the higher the speed of the gun or object for moving it to its desired position, giving a resultant speed approximately proportional to the pressure exerted. This also insures stability of control. In carrying the invention into effect, an auxiliary sight bar or controlling element is utilized and an important object is to provide means for obtaining a large amplification of movement imparted to the controlling devices by a comparatively small movement of the controlling element. This insures rapid and effective response by comparatively slight effort on the part of the operator. A further feature of importance is to provide a character of controlling devices which likewise require comparatively small movement for obtaining quick and variable response according to the required movement and wherein a slight change will produce a responsive effect. This aids in securing high accuracy in the positioning of the gun or other apparatus to correspond with the position of the sight bar or controlling element. Another object is to gradually reduce the speed of the gun as it approaches its position corresponding to that of the sight bar and then to apply dynamic braking to insure that the gun will be stopped at a position quite accurately corresponding to that of the sight bar. Other objects and advantages will be understood from the following description and accompanying drawings which show one embodiment of the invention.

Figure 10:
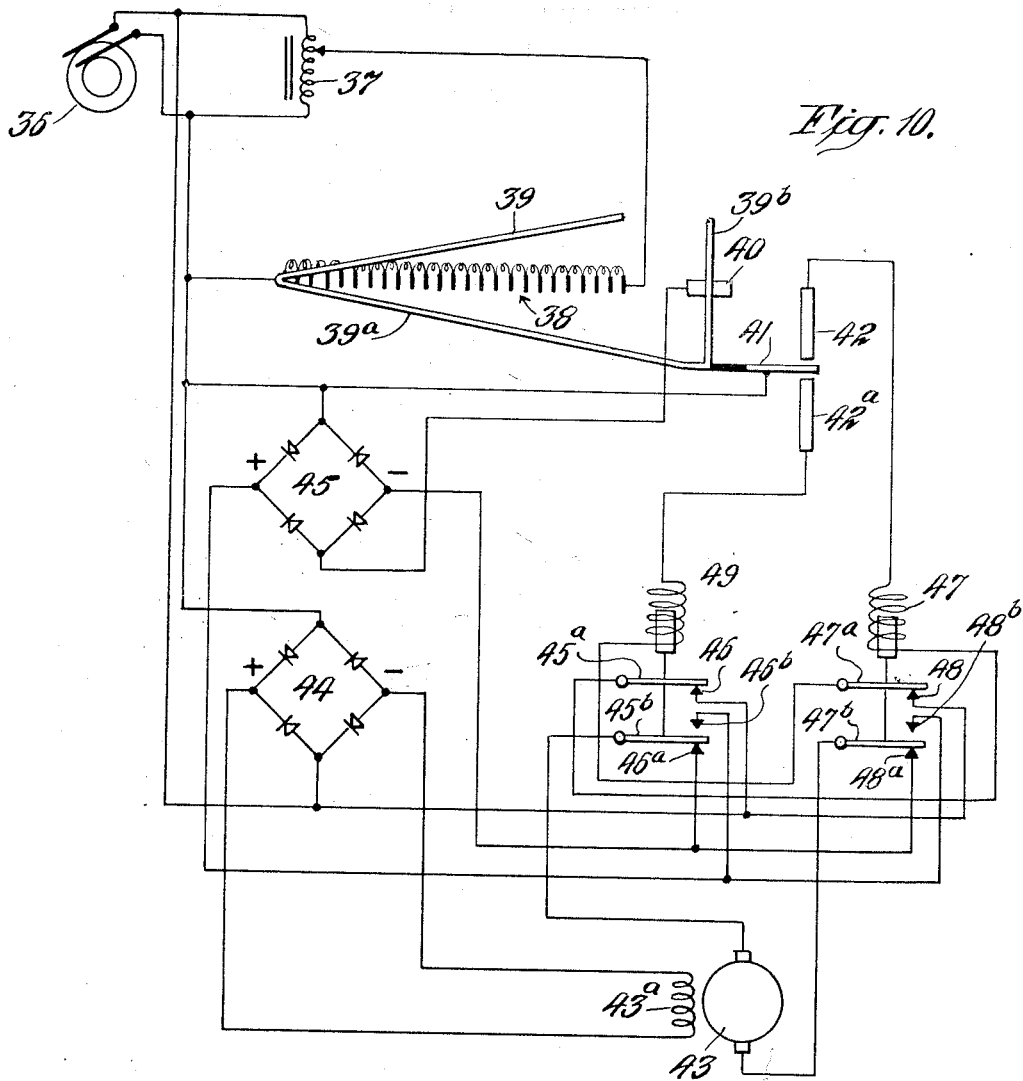

Fig. 1 is a plan view showing in a general way a gun and its mounting and the controlling apparatus; Fig. 2 is a vertical section on the line 2—2 of Fig. 1; Fig. 3 is an enlarged vertical section on the line 3—3 of Fig. 1; Fig. 4 is an enlarged side view of a portion of Fig. 1 showing the controlling parts; Fig. 5 is an enlarged vertical end view, partly in section, of a portion of Fig. 4 looking in the direction of the arrows 5—5 of Fig. 4; Fig. 6 is an end view looking in the direction of the arrows 6—6 of Fig. 4; Fig. 7 is a section of connecting parts on the line 7—7 of Fig. 4; Fig. 8 is a vertical section of a support on the line 8—8 of Fig. 4; Fig. 9 is a circuit diagram showing the control of the driving motors when a direct current source of energy is used; and Fig. 10 is a circuit diagram showing the control of the motors when an alternating current source is utilized.

Referring to Figs. 1 and 2, the gun 11 or other object which is to be controlled is indicated as mounted on a support 11a which is fixed to a platform 12. This platform may normally be positioned in a horizontal plane but is pivotally supported by bearings 13 so that it may be turned to any angular position on its horizontal axis. The bearing supports 13 are carried by a circular ring 14 and project inwardly therefrom and the ring is positioned in a horizontal plane. However, this ring is rotatable in its plane about its vertical axis and at certain portions of its periphery is provided with outwardly extending plates 14a which embrace fixed roller bearing supports on the upper and lower sides of a fixed ring 15. Supporting posts 15a are fixed to this ring at their upper ends and in turn are fixed to the foundation which forms the main support of the apparatus, such as an anti-aircraft gun base, or any base on land or on a ship, or may be the supporting frame of an aeroplane when the gun is carried by an aircraft.

In order to move the gun to any position in a horizontal plane, the ring 15 is provided on its inner face with gear teeth 15b throughout its inner circumference. Fixed to the ring 14, as shown in Figs. 1 and 3, is an electric motor 16 provided with a vertical shaft carrying a gear 16a on its upper end and which serves to drive through the gear 16b a gear 16c. The latter gear meshes with the teeth 15b of the ring 15 and it is apparent that when the motor 16 is in operation it will cause the ring 14 to turn in a horizontal plane in one direction or the other according to the direction of rotation of the motor and thereby enable the gun to assume any traverse position. Instead of using one driving motor and its driving gear, two or more such driving means may be mounted on the ring 14 uniformly spaced for securing additional driving power when found necessary.

In order to obtain movement of the gun to any angle in a vertical plane, the platform 12 at its opposite ends carries the shafts 17 which in turn have fixed thereto a gear 17a at each end of the shafts 17. These gears respectively mesh with a pair of toothed rings 18 which are positioned in vertical parallel planes and fixed to the ring 14 at opposite portions of the ring 14, as well shown in Fig. 2. One of the shafts 17 is shown as having fixed thereto a gear 17b which is driven by a gear 17c. The latter gear is driven by an electric motor 19 mounted on the platform 12 as indicated in Fig. 1. This motor is adapted to rotate in opposite directions and it is apparent that when the motor turns in one direction the gun will be raised to any desired elevation and that when the motor turns in the opposite direction a reverse movement of the gun will take place. If required, an additional motor 19 may be utilized in driving the other shaft 17.

It is apparent that by actuating the motor 16 in either direction and the motor 19 in either direction, the gun may be brought to any desired angular position for hitting an objective in any direction, the gun always taking the resultant position depending upon the control by the motors.

The automatic control of the gun position is accomplished by the provision of a sight bar or rod which in turn simultaneously controls the devices for actuating the motors in either direction. The normal position of this sight bar is parallel to the line of the gun sights; and when it is desired to move the gun in line with an objective, it is merely necessary to turn the sight rod towards and finally aim it at the objective whereupon the control apparatus will automatically cause the motors to position the gun in any direction assumed by the sight rod.

The sight rod 20 may be mounted in any position on the platform 12 or in any frame in fixed relation thereto; and in the present instance is shown mounted upon the fixed frame support 11a of the gun; and is shown positioned a little above the gun with a normal position parallel to the line between the gun sights. The sight rod is mounted at the upper end of a support 20a by a universal pivotal support 20b, as indicated in Fig. 8. The front end of the sight rod is provided with a handle 20c whereby the operator may move the rod towards and sight it on any objective by turning it on its universal pivot, a seat for the gunner being indicated at 21.

At the opposite end of the sight rod from the handle is a side extension 20d which, as shown in Fig. 1 extends beyond the side of the gun and as shown in Fig. 2, also extends downwardly. The end of the extension 20d is provided with oppositely located pins, as shown in Fig. 7, which engage a slotted fork 22a formed on one end of a rod or bar 22. This rod is mounted on a universal pivot 22b, such as shown in Fig. 8, the pivotal support being fixed to a frame carried by the platform 12. The portion of the rod 22 at one side of its pivot 22b is much longer than the slotted end of the rod and it results that any movement imparted to the handle 20c of the sight rod by the operator is considerably amplified in the movement of the inner end of the rod 22.

The front end of the rod 22 which is the end nearest the operator is bent at right-angles and provided with a downward extension 22c. This extension of the rod carries movable parts for controlling the two motors 16 and 19 and the parts are so related that when the extension 22c is moved vertically it will control one of the motors without controlling the other and when it is moved horizontally it will control the other motor without affecting the first one. The parts actuated by the extension of the rod 22 are the movable contact arms 23 and 24 of a pair of rheostats, or other suitable variable voltage device. These rheostats should be of a character which have a large number of steps and wherein the movement of the contact arm is comparatively small for securing a large change in the number of contacts passed over by the contact arm of the rheostat. This results in the control of the motors being quite sensitive to a small change in movement of the contact arms and in view of the mechanical amplification of the movement of the handle of the sight bar by the relationship of the parts already described, the rheostat arms will be quickly moved over a considerable range by a comparatively small movement of the sight bar. One form of rheostat which may be desirably used is that shown in my Patent No. 2,266,222 granted December 16, 1941, although in the present case the form of the contact arm or bar is different.

One of the tubular types of resistive units is controlled by the upper contact bar 23, as particularly shown in Fig. 5, the resistive unit being indicated at 25 and having its exposed contacts along an edge which is adapted to be variably engaged by the vertical movement of the inclined arm 23. The other resistive unit 26 is shown with its exposed contacts at the top portion thereof which are adapted to be variably engaged by horizontal movement of the inclined contact arm 24. The arm 22c is shown as having a side horizontal extension 22d for receiving within it a rod 23a which supports the contact arm 23. At the inner end of the rod 23a and in the arm 22d is a spring 27 which exerts pressure against the end of the rod 23a for maintaining the contact arm 23 in good electric contact with the contacts of the rheostat element 25. One side of the arm or sleeve 22d is slotted for receiving a pin 23b fixed to the rod 23a for preventing it from turning in its support while permitting longitudinal movement. The lower end of the arm 22c is likewise in the form of a sleeve for receiving a rod 24a which carries the contact arm or contact bar 24. A spring 27a is at the upper end of the rod 24a for insuring proper contact of the rheostat elements at all times; and a pin 24d is fixed to the rod 24a and extends within a slot in the sleeve for preventing turning of the contact arm.

In the normal position of the sight bar, the contact arms 23 and 24 are at their mid-positions; but if the sight bar is moved in a vertical plane, the contact arm 23 will be moved correspondingly and secure the desired control of the motor 19. Such movement will not affect the position of the contact arm 24. When the sight bar is moved in a horizontal plane, it obviously will result in moving the extension 22c sidewise in one direction or the other and thereby affect the motor 16 to operate in one direction or the other according to the direction of movement of the sight bar; but such movement will not affect the contact arm 23 and merely serve to press the spring 27 to a greater or lesser extent. When the sight bar is moved in a direction which is a resultant of a vertical and horizontal movement, the contact bar 23 will be adjusted to correspond with the vertical component of the movement and the contact bar 24 will be adjusted to correspond with the horizontal component of the movement. The control apparatus is such, as will later appear, that regardless of the direction of movement of the sight bar, the controlling apparatus will cause the gun or other controlled object to assume a corresponding position.

The sight bar is normally held in a fixed definite position by means which also exert an increasing force against movement of the sight bar by the operator the more the sight bar is moved from its normal position. By such means, the operator may adjust the sight bar a small amount with a comparatively small opposing force; but where a large range of movement of the gun is required, the operator will be obliged to initially exert a considerably increased effort in moving the sight bar to the new position. Fig. 6 shows a structure for securing this result wherein a ring 28 is shown supported by two posts 28a. These are in turn secured to the frame supporting the sight rod as shown in Figs. 1, 2 and 4. The sight bar passes centrally through the ring 28 in its normal position and is held in this position by tension springs 29 fixed at their inner ends to the sight bar and at their outer ends to the ring 28. This mounting of the sight bar obviously permits the same to be moved in any direction desired and, as already explained, exerts an increasing force against movement of the sight bar from its normal position the greater the amount of movement of the sight bar.

Fig. 9 shows the circuit connections and form of contact arm for obtaining control of the motor 16 or 19 when utilizing direct current as the source of energy. A direct current motor armature is indicated at 30 having a field winding 30a. The latter is energized from a source of direct current of constant voltage indicated as a battery 31. The motor armature derives its current from two sources of direct current, such as the batteries 32 and 32a connected in series with each other in additive relationship, although the energy may be derived from a divided source of direct current of constant voltage. The rheostat contacts of the resistive elements 25 or 26 are indicated by the character 33; and the contact bar 34 corresponds to the contact arm 23 or contact arm 24. The arm 24 is positioned in a direction somewhat inclined to the row of contacts 33 and in its normal position engages the middle contact 33, as shown in Fig. 9. The middle contact 33 is connected to the connection between the sources 32 and 32a which in turn is connected to one terminal of the armature 30. The contact arm 34 is prolonged at one end and carries a crosswise extension 34a which is always in engagement with a fixed contact 35 connected to the other terminal of the armature 30.

In the position shown in Fig. 9, the motor field is energized and the armature is connected in a local loop of low resistance from one of its terminals to the mid-connection between the sources 32 and 32a and thence to the middle contact of the contacts 33 and thence by the contact bar 34 to the contact 35 and to the other terminal of the armature. This low resistance local armature circuit forms a braking circuit for electrodynamically bringing the motor to rest whenever the contact arm 34 attains its mid-position. Upon moving the contact 34 downwardly from the position shown in Fig. 9, a certain voltage will be impressed upon the motor armature depending upon the extent of movement of the contact bar. Assuming the bar be moved so that it engages an intermediate contact of the left-hand portion of the contacts 33, the armature circuit would pass from the positive terminal of the source 32 upwardly through the armature to the contact 35 and to the bar 34 and then through a portion of the resistance of the rheostat to the negative terminal of the source 32. The voltage impressed upon the motor armature and its corresponding speed would depend upon the extent of the downward movement of the bar 34. When the bar is moved downwardly to its limiting position, the left-hand end of the arm would then engage the left-hand contact of the resistive unit and the full voltage of the source 32 would be impressed upon the motor armature and thereby cause the motor to operate at its highest speed. When the bar is returned to the mid-position shown in Fig. 9, the speed of the motor is gradually decreased and at the mid-position the low resistance local circuit of the motor armature would cause the same to be brought quickly to rest by the electrodynamic braking effect already referred to.

When the contact bar 34 is moved upwardly from the position shown in Fig. 9 to engage an intermediate contact 33, the current through the motor armature would pass from the positive terminal of the source 32a through a portion of the resistance device to the contact bar and thence to the contact 35 and downwardly through the motor armature to the negative terminal of the source 32a, the voltage and motor speed depending upon the extent of movement of the contact bar. But in this latter operation, the current passes through the motor armature in the reverse direction to that previously considered and causes the motor to operate in the opposite direction from that first considered. When the contact bar is moved to its upper limit, it will engage the right-hand contact 33 and thereby impress the full voltage of the source 32a upon the motor armature and cause the same to rotate at full speed. Upon returning the bar to the mid-position shown in Fig. 9, the speed of the motor is gradually decreased and at the mid-position shown in Fig. 9, the electrodynamic braking effect causes it to be quickly brought to rest.

It being understood that each of the motors 16 and 19 of the previously described parts is provided with controlling devices and connections of the character shown in Fig. 9, the operation of the apparatus may now be described. Assuming the parts are in the position shown in Fig. 1 and that it is desired to move the gun in a horizontal plane to a position in line with the objective, the sight rod 20 is turned by the operator on its pivot towards and finally to a position in line with the objective. Assuming that the sight rod is turned in a clockwise direction, it will cause the contact bar 24 corresponding to the bar 34 of Fig. 9 to be moved from its mid-position so as to engage one of the contacts of the rheostat to the right of the mid-contact. This, as already explained, will cause the motor 16 controlled thereby to turn the platform 12 in a clockwise direction at a speed corresponding with the extent of movement of the sight bar from its initial position. As the platform turns, it moves the gun to cause it to approach the aligned position of the sight rod and during this movement the speed gradually decreases because the movement of the platform 12 causes the resistive device 26 to move with it and thereby causes this device to move under the contact bar to gradually increase the amount of resistance in the armature circuit of the motor 16. When the resistive device attains a position such that the contact bar 24 is at its original mid-position, the electrodynamic braking action takes place, stopping the motor 16 and with the result that the gun has been brought into alignment with the objective corresponding to the position to which the sight bar was moved by the operator. In this manner the gun is caused to automatically assume a position corresponding with the position to which the sight bar has been moved. Now assume that it is desired to turn the gun in a horizontal plane in the opposite direction from that just considered. The sight bar is then turned in a counter-clockwise direction towards and finally in alignment with the desired new position which causes the contact arm 24 to be moved in such direction that it will assume a position engaging one of the contacts of the resistive device to the left of the mid-contact. This will cause a reversal of current through the armature of the motor 16 and result in turning the platform 12 in a counter-clockwise direction at a speed corresponding to the extent of movement of the sight bar from its normal position. As the platform 12 is driven by the motor, the speed gradually decreases due to the resistive device being brought toward a position such that the mid-contact of the resistive device will engage the contact bar 24 and then the electrodynamic action occurs bringing the motor and platform 12 to a stop in a position corresponding with the aligned position of the sight rod. Thus the platform 12 and the gun may be moved to any desired position in a horizontal plane following the movement of the sight rod until the position of the gun corresponds to that of the sight rod. In some cases it may be desired to move the sight bar beyond its permissible amount in order to be in line with its objective and in that case it is moved in the direction desired to the full speed limiting position and as the motor turns the platform at the full speed rate, the operator continues to move the sight rod toward the desired position until it is in the final desired position and is then held there. When so held, the motor speed will gradually decrease in the manner already described and the platform and gun will then be brought to their desired position. During the various movements in a horizontal plane, the contact arm 23 is maintained in its mid-position owing to the structure already described with reference to Fig. 5 and the motor 19 is not affected.

When it is desired to move the gun in a vertical plane, the sight rod is turned on its pivot to raise or lower the contact bar 23 which likewise corresponds to the contact bar 34 of Fig. 9. Assuming that it is desired to elevate the direction of the gun, the sight rod will be turned upwardly towards and to a position in alignment with the objective which will cause the contact bar 23 to be depressed and to engage an intermediate contact of the resistive device to the left of the mid-position. This will cause current to pass through the armature of the motor 19 in such a direction as to cause the platform 12 and the gun to be turned upwardly at a speed corresponding with the extent of movement of the sight rod from its normal position. During this action the resistive device 25 is moved gradually until the mid-contact thereof engages the contact bar 23 which results in the platform and gun being brought to rest in a position corresponding with that of the sight bar in the manner already explained. When the sight bar is turned downwardly, the direction of rotation of the motor 19 is reversed and the platform and gun is caused to be moved downwardly to a position corresponding with that of the sight rod. It is thus apparent that any desired position of the gun in a vertical plane may be attained by merely turning the sight bar upwardly or downwardly on its pivot in a vertical plane. During such operations the contact bar 24 controlling the motor 16 is not affected by reason of the structure described with reference to Fig. 5.

Now assume that it is desired to move the gun to any selected position other than in a horizontal or vertical plane. In such case the sight rod is turned on its pivot towards and to the position to which the gun is to be brought and this will result in actuating both of the motors 16 and 19 at the same time because the sight rod will cause a sidewise movement of the contact bar 24 in the direction and to the extent that it is desired to move the gun in a horizontal direction and the contact bar 23 will be moved to a position corresponding in the direction and extent of movement that the gun is to be moved in a vertical direction. The actuation of the two motors thus cooperate in the manner already described with reference to each of them to bring the gun to a resultant position corresponding with the position of the sight rod. The relative speeds of the motors will depend upon the extent of movement relatively required from them and their speeds will be reduced gradually so that when the gun is brought to its final position both motors will be electrodynamically braked at the same time. In this manner the gun may be moved to any selected position in any direction, the vertical and horizontal components of the movement required to place the gun in the new position being respectively responded to and satisfied by the two motors in the manner already described with reference to each motor acting individually.

In the automatic response of the motors, the action is dependent upon the pressure against and movement of the sight bar because the greater the pressure and movement, the higher the speed of the motors and the motors are gradually and quickly brought to rest when the gun assumes the position corresponding to the final position of the sight rod. It is apparent that instead of mounting the sight rod over or close to the gun, it may be mounted at any convenient location provided the rheostat contact bars and rheostat contact devices are respectively controlled by the operator and by the movement of the gun or other similarly moved object respectively. In case more than one driving motor is required for actuation of the gun or other object in the vertical or in the horizontal direction, the armatures of the additional motors may be connected in parallel or in series with each other and controlled by the same contact bar and resistance device; or the controlling apparatus could be duplicated throughout and controlled by a single sight bar. Likewise instead of controlling one gun or object, any number of them could be controlled by connecting the driving motors of the additional units in parallel respectively with the motors 16 and 19, or in series according to the design of the various parts of the related apparatus. Also, the parts already described could be duplicated for each additional unit and the controlling sight bar of each unit actuated by a master sight bar of the whole group.

In Fig. 10, the various parts and their connections are shown for the operation of each of the two motors, such as the motors 16 and 19 already referred to; but in Fig. 10 a source of single-phase alternating current is utilized instead of a direct current source. The alternating source 36 is indicated as having connected thereto an auto-transformer 37 provided with suitable taps for imposing a proper voltage upon a resistive device having a multiplicity of contacts 38. The contact bar engaging these contacts and which is to be controlled by the sight bar is shown of V form having the two arms 39 and 39a; and the normal mid-position of this bar is as shown in Fig. 10 with the apex of the V engaging the left-hand contact 38. The contact bar is provided with a crosswise extending arm 39b which is always in engagement with a fixed contact 40 in any position of the contact bar. There is connected with the contact bar an insulated contact 41 which is adapted to slidably engage a contact 42 or a contact 42a when the contact arm is moved from its mid-position. The armature of the motor corresponding to the motor 16 or 19 is indicated by the character 43 and the field winding thereof by the character 43a. The field is maintained constant and is indicated as being supplied from a rectifier 44 shown as being of the bridge-connected copper oxide type but any other suitable form of rectifier could be used. This rectifier is shown as being connected to the alternating current source 36. The motor armature is supplied from the positive and negative terminals of another rectifier 45 likewise indicated as being of the bridge-connected copper oxide type, although any other suitable form of rectifier could be used. This rectifier is supplied with alternating current from the source 36, the upper terminal being shown as connected directly to the lower supply line of the source 36 and the lower terminal of the rectifier being shown connected to the contact 40 and thence through the arm 39b and arm 39a to the left-hand terminal of the contacts 38 which is likewise connected to the lower supply line of the source 36. It is apparent that in this normal position of the parts indicated in Fig. 10, no alternating current voltage is supplied to the rectifier 45 and no direct current voltage is delivered therefrom under these conditions.

There are two relays provided for controlling the supply of current to the motor armature 43 and for reversing its direction of rotation. The relay winding 49 of one of these relays controls a pair of movable contacts 45a and 45b. The contact 45a normally engages a fixed contact 46 and the contact 45b normally engages a fixed contact 46a but also engages another fixed contact 46b when the winding 45 is energized. The relay winding 47 similarly controls movable contacts 47a and 47b which respectively engage fixed contacts 48, 48a and 48b. One terminal of the winding 49 is connected to the contact 42a and its other terminal is connected to the contact 47a. One terminal of the winding 47 is connected to the contact 42 and its other terminal is connected to the contact 45a. The fixed contacts 46 and 48 are connected together and to the upper supply line of the source 36. One terminal of the motor armature is connected to the contact 45b and the other terminal to the contact 47b. The two contacts 46b and 48b are connected together and to the positive terminal of the rectifier 45. The two contacts 46a and 48a are connected together and to the negative terminal of the rectifier 45.

When the form of control shown in Fig. 10 is utilized, the sight bar 20 is connected to move two contact bars each having arms 39, 39a and 39b for controlling the two motors corresponding to the motors 16 and 19. One of such contact bars is moved when the sight bar is moved in a horizontal plane and the other contact bar is moved by the sight bar when it is moved in a vertical plane, in the same manner already described with reference to the movement of the two contact bars 24 and 23.

The control of one of the motors, such as the motor 16, will first be considered as controlled by the sight bar when moved in a horizontal plane. With the normal condition of the parts as shown in Fig. 10, neither of the two relays is energized and the motor armature is connected in a closed local circuit of low resistance through the two contacts 45b and 47b and the fixed contacts 46a, 48a giving an electrodynamic braking effect when the motor is brought to rest, the field of the motor being constantly energized from the alternating current source through the rectifier 44. Upon the movement of the sight bar in a clockwise direction, the contact bar of Fig. 10 will be moved from the position shown to cause the arm 39a to engage an intermediate contact 38 and the extent of movement of the sight bar will determine the voltage and speed imposed upon the motor armature. Assuming the contact bar is thus moved, the contact 41 will engage the contact 42 and energize the winding 47 of its relay by a circuit which passes from the lower supply line of the source 36 to the contact 41, contact 42, winding 47, contacts 45a and 46 to the upper supply line of the source. The energizing of the relay winding 47 will cause the contacts 47a and 47b to move away from their fixed contacts and cause the contact 47b to engage the contact 48b. This will complete a circuit through the motor armature from the rectifier 45 which may be traced from the positive terminal of the rectifier to the contact 48b, contact 47b, upwardly through the armature 43 to the contact 45b and contact 46a and thence to the negative terminal of the rectifier. The voltage supplied to the armature will depend therefore upon the voltage derived from the rectifier 45 and this is in turn controlled by the voltage of the alternating current imposed upon the rectifier determined by the extent of movement of the arm 39a by the sight bar. Assuming this arm has been moved to engage the mid-contact 38, the alternating current voltage impressed upon the rectifier 45 will be about one-half of that available from the auto-transformer 37, the circuit to the rectifier being traced from the tap connection of the transformer, thence through about half of the resistance device to the contact arm 39a and arm 39b to the contact 40 and then through the rectifier to the lower supply line of the source. It follows that the motor armature will then be subjected to a voltage derived from the rectifier 45 depending upon the voltage of the alternating current supplied thereto and under the assumptions made, the motor may be assumed to operate at about one-half speed for turning the platform 12 and the gun in a clockwise direction corresponding to the movement of the sight bar. As the motor turns the platform 12 and the gun, it gradually moves the resistive device having the contacts 38 under the arm 39a which gradually reduces the voltage and speed imposed upon the motor armature until the position of the gun coincides with that determined by the sight rod at which time the parts have again assumed the relationship as shown in Fig. 10. This opens the circuit of the relay winding 47 at the contact 41 which permits its contacts to move to the position shown, placing the armature on its local braking circuit for bringing it to rest. When the sight bar is moved in a counter-clockwise direction, the arm 39 of the contact bar will be moved correspondingly and the contact 41 will engage the contact 42a, energizing the winding 49 through a circuit from the lower supply line to the contacts 41 and 42a through the winding 49 and contacts 47a and 48 to the upper supply line. This energization of the winding 49 causes its contacts to move from the position shown and the contact 45b to engage the contact 46b. This closes the motor armature circuit from the positive terminal of the rectifier 45 through the contacts 46b and 45b and downwardly through the armature 43 to the contacts 47b and 48a and thence to the negative terminal of the rectifier. This reverses the direction of rotation of the motor corresponding to the motor 16 and results in turning the platform 12 and gun to correspond with the position of the sight rod in the manner already described. This results in bringing the contacts 38 in relationship to the contact arm 39, as shown in Fig. 10, by the movement of the gun to a position corresponding to that of the sight rod, the motor then being electrodynamically braked. When the sight rod is moved in a vertical plane, it will actuate a similar contact bar having arms 39, 39a and 39b and cause the control of the motor, such as the motor 19, to bring the gun to a position corresponding with that to which the sight rod is moved. When the sight rod is moved to any desired position, the two motors controlled by their respective contact bars will cooperate to bring the gun to a position corresponding thereto in the manner referred to with reference to Fig. 9 and the motors will be individually controlled in the manner already described with reference to Fig. 10.

The relays of Fig. 10 are electrically interlocked by the contacts 45a and 47a which insures that neither relay can be energized unless the other is deenergized, as the completion of the circuit through the winding of one relay requires that the contact 46 or 48 of the other relay shall be engaged by its respective contact. This also insures against the improper operation of the relays in case of the occurrence of a short-circuit condition and aids in overcoming the objectionable effects of shocks or jars which otherwise might take place.

It will be apparent that this improvement secures the rapid movement of the gun or other object to any selected position corresponding with that of the sight bar or other controlling element and that when the gun approaches the selected position of the controlling element, its rate of movement is gradually decreased and then brought to rest by the electrodynamic braking action at a position corresponding with that of the controlling element; and the parts, as already explained, may be designed to give a high degree of accuracy in conforming the position of the gun to that of the sight bar in any selected position. The controlling apparatus is of a simple character with comparatively few relatively movable parts and may be depended upon in long continued use without requiring adjustments or repairs.

Although certain embodiments of the invention have been disclosed, it will be understood that various modifications may be made for adaptation to particular requirements without departing from the scope of the invention.

I claim:

1. The combination of a controlling element movable to different positions, a movable object normally having a position corresponding to the position of said element, a reversible motor for moving said object to different positions, controlling means for varying the speed of the motor and reversing the direction of rotation of the motor having a contact bar engaging a series of contacts of a variable voltage device, said contacts being aligned in a straight row, said contact bar being inclined to said row of contacts with the same angle of inclination in the different adjustable positions of said contact bar with reference to said row of contacts, said contact bar being adjustable over said contacts in a direction at right-angles to said row of contacts, a source for supplying energy to said motor, said controlling means comprising connections between said source, motor, contact bar and variable voltage device for operating the motor in one direction when the contact bar is moved from its normal mid-position in one direction therefrom and at variable speeds dependent upon the extent of movement of said contact bar and for operating the motor in the reverse direction when the contact bar is moved in the opposite direction from its mid-position and at variable speeds depending upon the extent of movement of said contact bar in said opposite direction, mechanical means for connecting said controlling element with said contact bar for actuating said contact bar from its mid-position in one direction or the other and to an extent depending upon the direction and extent of movement of said controlling element from its mid-position, and means for relating said variable voltage device to said movable object to move in correspondence thereto for decreasing the speed of the motor and for stopping the motor when said object has attained a position corresponding with that to which said element has been moved.

2. The combination of a controlling element movable to different positions, a movable object normally having a position corresponding to the position of said element, a reversible motor for moving said object to different positions, controlling means for varying the speed of the motor and reversing the direction of rotation of the motor having a contact bar engaging a series of contacts of a variable voltage device, said contacts being aligned in a straight row, said contact bar being inclined to said row of contacts with the same angle of inclination in the different adjustable positions of said contact bar with reference to said row of contacts, said contact bar being adjustable over said contacts in a direction at right-angles to said row of contacts, a source for supplying energy to said motor, said controlling means comprising connections between said source, motor, contact bar and variable voltage device for operating the motor in one direction when the contact bar is moved from its normal mid-position in one direction therefrom and at variable speeds dependent upon the extent of movement of said contact bar and for operating the motor in the reverse direction when the contact bar is moved in the opposite direction from its mid-position and at variable speeds depending upon the extent of movement of said contact bar in said opposite direction, mechanical means for connecting said controlling element with said contact bar and for amplifying the movement of said contact bar with reference to the movement of said controlling element and for actuating said contact bar from its mid-position in one direction or the other and to an extent depending upon the direction and extent of movement of said controlling element from its mid-position, and means for relating said variable voltage device to said movable object to move in correspondence thereto for decreasing the speed of the motor and for stopping the motor when said object has attained a position corresponding with that to which said element has been moved.

3. The combination of a controlling element movable to different positions, a movable object normally having a position corresponding to the position of said element, a reversible motor for moving said object to different positions, controlling means for varying the speed of the motor and reversing the direction of rotation of the motor having a contact bar engaging a series of contacts of a variable voltage device, said contacts being aligned in a straight row, said contact bar being inclined to said row of contacts with the same angle of inclination in the different adjustable positions of said contact bar with reference to said row of contacts, said contact bar being adjustable over said contacts in a direction at right-angles to said row of contacts, a source for supplying energy to said motor, said controlling means comprising connections between said source, motor, contact bar and variable voltage device for operating the motor in one direction when the contact bar is moved from its normal mid-position in one direction therefrom and at variable speeds depending upon the extent of movement of said contact bar and for operating the motor in the reverse direction when the contact bar is moved in the opposite direction from its mid-position and at variable speeds depending upon the extent of movement of said contact bar in said opposite direction, mechanical means for connecting said controlling element with said contact bar for actuating said contact bar from its mid-position in one direction or the other and to an extent depending upon the direction and extent of movement of said controlling element from its mid-position, and means for relating said variable voltage device to said movable object to move in correspondence thereto for decreasing the speed of the motor and for stopping the motor when said object has attained a position corresponding with that to which said element has been moved, said controlling means also having connections for electrodynamically braking the motor when said object has attained a position corresponding with that to which said element has been moved.

4. The combination of a controlling element movable in different angular directions, movable apparatus normally having a position corresponding to the position of said element, a reversible electric motor for moving a portion of said apparatus in opposite directions, a second reversible electric motor for moving another portion of said apparatus in opposite directions, controlling means for actuating one of said motors in opposite directions, controlling means for actuating the other of said motors in opposite directions, each of said controlling means comprising two relatively movable engageable parts for reversing its motor upon displacement of one of said parts in opposite directions from a mid-position with reference to its other engaged part, connecting means between said controlling element and both of the said parts movable from mid-position for displacing one of said parts in opposite directions from its mid-position for actuating said first named motor in opposite directions respectively and for displacing the other of said parts in opposite directions from its mid-position for actuating said second named motor in opposite directions respectively when said controlling element is moved in a direction at an angle to the direction of movement for actuating said first named motor, and means for moving the two parts engaged by said displaced parts with reference to said displaced parts by the movement of said apparatus for stopping the respectively actuated motor when said apparatus has attained a position corresponding with that to which said controlling element has been moved.

5. The combination of a controlling element movable in different angular directions, movable apparatus normally having a position corresponding to the position of said element, a reversible electric motor for moving a portion of said apparatus in opposite directions, a second reversible electric motor for moving another portion of said apparatus in opposite directions, controlling means for actuating one of said motors in opposite directions, controlling means for actuating the other of said motors in opposite directions, each of said controlling means comprising two relatively movable engageable parts for reversing its motor upon displacement of one of said parts in opposite directions from a mid-position with reference to its other engaged part, connecting means between said controlling element and both of the said parts movable from mid-position for displacing one of said parts in opposite directions from its mid-position for actuating said first named motor in opposite directions respectively and for displacing the other of said parts in opposite directions from its mid-position for actuating said second named motor in opposite directions respectively when said controlling element is moved in a direction at an angle to the direction of movement for actuating said first named motor and for actuating both of said motors simultaneously in one direction or the other when said controlling element is moved in an intermediate angular direction, and means for moving the two parts engaged by said displaced parts with reference to said displaced parts by the movement of said apparatus for stopping the respectively actuated motor or motors when said apparatus has attained a position corresponding with that to which said controlling element has been moved.

6. The combination of a controlling element movable in different angular directions, movable apparatus normally having a position corresponding to the position of said element, a reversible electric motor for moving a portion of said apparatus in opposite directions, a second reversible electric motor for moving another portion of said apparatus in opposite directions, controlling means for actuating one of said motors in opposite directions, controlling means for actuating the other of said motors in opposite directions, each of said controlling means comprising two relatively movable engageable parts for reversing its motor upon displacement of one of said parts in opposite directions from a mid-position with reference to its other engaged part and for varying its speed according to the extent of movement of the displaceable part from its mid-position with reference to the engaged part, connecting means between said controlling element and both of the said parts movable from mid-position for displacing one of said parts in opposite directions from its mid-position for actuating said first named motor in opposite directions respectively and at variable speeds according to the extent of movement of said controlling element and for displacing the other of said parts in opposite directions from its mid-position for actuating said second named motor in opposite directions respectively and at variable speeds according to the extent of movement of said controlling element when said controlling element is moved in a direction at an angle to the direction of movement for actuating said first named motor and for actuating both of said motors simultaneously in one direction or the other when said controlling element is moved in an intermediate angular direction and at variable speeds according to the extent of movement of said controlling element, and means for moving the two parts engaged by said displaced parts with reference to said displaced parts by the movement of said apparatus for stopping the respectively actuated motor or motors when said apparatus has attained a position corresponding with that to which said controlling element has been moved.

7. The combination of a controlling element movable in different angular directions, movable apparatus normally having a position corresponding to the position of said element, a reversible electric motor for moving a portion of said apparatus in opposite directions, a second reversible electric motor for moving another portion of said apparatus in opposite directions, controlling means for actuating one of said motors in opposite directions, controlling means for actuating the other of said motors in opposite directions, each of said controlling means comprising two relatively movable engageable parts for reversing its motor upon displacement of one of said parts in opposite directions from a mid-position with reference to its other engaged part and for varying its speed according to the extent of movement of the displaceable part from its mid-position with reference to the engaged part, connecting means between said controlling element and both of the said parts movable from mid-position for displacing one of said parts in opposite directions from its mid-position for actuating said first named motor in opposite directions respectively and at variable speeds according to the extent of movement of said controlling element and for displacing the other of said parts in opposite directions from its mid-position for actuating said second named motor in opposite directions respectively and at variable speeds according to the extent of movement of said controlling element when said controlling element is moved in a direction at an angle to the direction of movement for actuating said first named motor and for actuating both of said motors simultaneously in one direction or the other when said controlling element is moved in an intermediate angular direction and at variable speeds according to the extent of movement of said controlling element, and means for moving the two parts engaged by said displaced parts with reference to said displaced parts by the movement of said apparatus for stopping the respectively actuated motor or motors when said apparatus has attained a position corresponding with that to which said controlling element has been moved, said controlling means also having connections for electrodynamically braking the motor or motors when said apparatus has attained a position corresponding with that to which said controlling element has been moved.

8. The combination of an electric motor, and means for actuating the motor at variable speeds and for reversing the motor comprising a divided source of direct current, a variable voltage device having a plurality of contacts in a straight row connected across said source and having an intermediate contact connected to an intermediate portion of said divided source, a contact bar slidably movable across said row of contacts in a direction at right-angles to said row of contacts, said contact bar being inclined to said row of contacts with the same angle of inclination in the different adjustable positions of said contact bar with reference to said row of contacts, and connections between the armature of the motor and said contact bar and said intermediate portion of said divided source for operating the motor at different speeds depending upon the extent of movement of said contact bar from engagement with said intermediate contact and for reversing the motor according to the direction of movement of said contact bar from said intermediate contact.

FRANK G. LOGAN.